March 2, 1943.  J. BETHENOD  2,312,996

SYSTEM FOR CONTROLLING THE TEMPERATURE IN THE INTERIOR OF VEHICLES

Filed Oct. 12, 1938

Inventor:
Joseph Bethenod
By: Haseltine, Lake & Co.
Attorneys

Patented Mar. 2, 1943

2,312,996

UNITED STATES PATENT OFFICE 2,312,996

SYSTEM FOR CONTROLLING THE TEMPERATURE IN THE INTERIOR OF VEHICLES

Joseph Bethenod, Paris, France; vested in the Alien Property Custodian

Application October 12, 1938, Serial No. 234,731
In France October 22, 1937

3 Claims. (Cl. 237—2)

The present invention relates to a system for producing a desired temperature in the interior of vehicles, and, more particularly in rail or like track vehicles. An object of the invention is to provide a system which will permit of effecting heating or cooling from self-governing temperature in each vehicle of a train, while considerably simplifying the maintenance of the installation.

The method of operation of a system according to the invention is based in principle on the utilisation of the heat developed in a dynamometric brake, the specific construction of which may vary considerably without going beyond the scope of the invention.

In general, the braking effect may be produced in a stationary apparatus in which a pump sets up a circulation of liquid. This apparatus may, for example, be formed by a column of perforated plates, lattice work or the like, through which the liquid is forced. Alternatively kinetic energy could be imparted to a body of liquid by a nozzle and the liquid caused to give up such energy by impact against a fixed wall or the like.

It is also possible to employ an hydraulic brake, for example of the Froude type, having a rotor driven by one of the axles, the liquid effecting the braking being maintained in circulation by means of a pump so as to transmit the heat produced into radiators distributed in the interior of the vehicle to be heated.

There may even be employed a valveless pump having an alternating movement which, for example, imparts a reciprocating motion to the entire liquid column, the heating then being obtained by the friction of the liquid against the walls of pipes through which it flows. The said pump could be provided with a slack piston or with a piston provided with orifices, the heating then being produced in the pump itself without the assistance of any piping. The same effect may be obtained with a gear pump or a blade pump, or even by an apparatus comprising a cylindrical body filled with liquid in which rotates a rotor provided with blades arranged in star formation.

The hydraulic brake could also be replaced by an equivalent brake without going beyond the scope of the invention. In particular, an electric eddy current brake could be employed for heating by means of hot air, the heating being effected by the forced passage of the air through the said apparatus, or by the passage of the air over the outer walls thereof. With such an apparatus, the heating effect may be maintained approximately constant by suitably dimensioning the rotor.

Devices such as clutches may be employed to stop the production of heat. This may also be achieved by means of the circulation pump, which for this purpose may be embloyed to empty the stator of the hydraulic brake.

The transmission between the axle and the rotor may be effected by one of the many devices, such as belts, spur or conical gears, and the like, employed for example, for driving the lighting dynamos of trains. Furthermore, the liquid circulating in the brake may be different from that circulating in the heat radiators and may, for example, have a higher boiling point, in which case the exchange of heat between the two may be effected by any known device. Moreover, a heat accumulator may be provided to ensure heating when the train is stationary. The rate at which the heat is liberated when the braking apparatus is in operation may be maintained constant within certain speed limits by means of a by-pass combined with a control by a centrifugal regulator, and may also be automatically regulated by a suitably arranged thermostat or the like.

The invention may be advantageously applied to vehicles provided with an installation for heating by hot air circulation.

The accompanying drawing illustrates diagrammatically and solely by way of example, installations for carrying into practice the features of invention more generally described in the foregoing.

Figure 1:
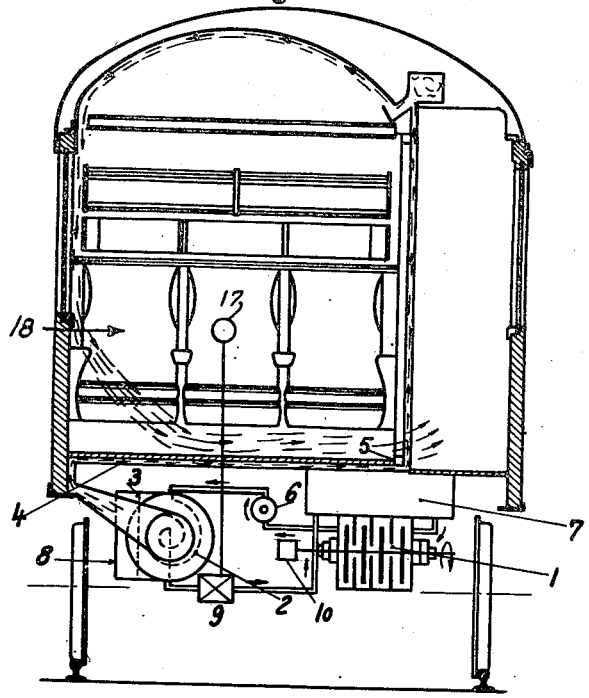
Figure 1 illustrates an installation employing an hydraulic brake and includes a cross-sectional view of the compartment of a coach heated by hot air circulation.

Referring to Figure 1 of the drawing, the system comprises a brake 1 driven by an axle through the intermediary of a pulley 10, which may form a clutch. The brake is so arranged as to produce the heating of a circulating liquid (for example oil or the like). To this end, the brake comprises a stator filled with liquid and a rotor composed of discs producing friction in the liquid. The said liquid is conveyed by a pump 6 into a coil 2, through which air is blown by a fan 3, which may also be driven by the axle, or by an electric motor. The heated air, after passing through a conduit 4, preferably disposed below the floor as illustrated, is allowed to escape at 5 at the bottom of the compartment to be heated, so as to pass over the walls of this compartment along the path indicated by the arrows. A thermostatic valve 9 is provided to ensure the maintenance of the temperature at a predetermined value, which may be regulated as desired, being connected to a thermostat 17 in the passenger compartment 18, and a reservoir 7 is provided in the closed circuit traversed by the liquid. A ventilation aperture is provided at 8. If the fan 3 is driven by an electric motor, it will be possible for it to function when the vehicle is stationary, and means which will be readily apparent to persons skilled in the art may be provided to utilise the heat stored in the reservoir 7.

It will be understood that numerous modifications may be made in this constructional form of the invention. In particular, when the fan 3 is actuated by the axle, the blades thereof may be automatically adjustable, so that the speed of flow of the hot air will remain within predetermined limits regardless of the speed of the train.

Figure 2:
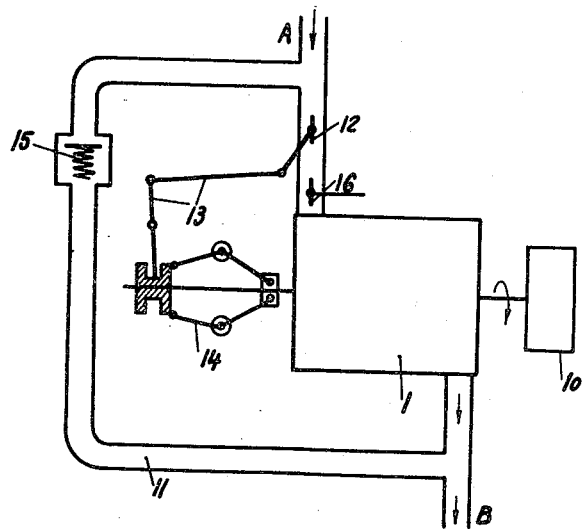
Figure 2 illustrates details of the regulating system which may be employed in combination with this installation.

In Figure 2, the brake is again indicated at 1 and its driving pulley at 10. The liquid flowing from the coil enters at A and is drawn in at B by the pump, its admission to the brake being controlled by a valve 12, the flap of which is controlled through the intermediary of a lever and link system 13 from a centrifugal regulator 14 which is driven by the shaft of the brake.

When the speed of the brake increases, the heat liberated tends to increase. At this instant, the masses of the regulator move apart and the flap of the cock 12 takes up such a position as to reduce the quantity of liquid entering the brake, which is thus partially emptied by the action of the circulation pump, whereby the quantity of heat produced at the speed in question is reduced. A by-pass 11 provided with an automatic spring-controlled valve 15 permits the liquid to continue to circulate about the brake. In order that the inlet aperture of the brake may be completely closed a hand controlled cock 16 is provided. The action of the brake may thus be completely stopped and the chamber thereof completely emptied.

What I claim as my invention and desire to secure by Letters Patent of the United States is:

1. A dynamometric brake for a vehicle having a rotatable axle, including a hollow stator filled with a liquid and adapted to be mounted on said vehicle, a rotor immersed in the liquid in said stator and driven from said axle so as to turn in the liquid and transform the energy of rotation into heat, a utilization apparatus, a conduit system connected thereto and to the stator for carrying fluid to and from said stator, pump means for pumping the fluid heated in the stator into the conduits of said utilization apparatus, and automatic control means responsive to the speed of rotation of said axle and connected in said conduit system for substantialy regulating and maintaining the quantity of heat produced in said brake at a constant value as the speed of rotation of said axle varies.

2. A system as claimed in claim 1, wherein the automatic control means for regulating the quantity of heat comprise a thermostatic valve interposed in the conduit system and means for controlling said valve by means of the heat radiated by the utilization apparatus.

3. A system as claimed in claim 1, wherein the automatic control means for regulating the quantity of heat comprise a by-pass connected in shunt to the stator of the brake, means for controlling the section of the conduit system on the inlet side of the stator, and regulating means driven by the rotor and acting on the said control means so as to restrict the flow of liquid through said inlet section of said conduit system when the rotor speed is increased beyond a predetermined value.

JOSEPH BETHENOD.